T. T. TASKER.
Steam Heater.
No. 12,039. Patented Dec. 5, 1854.
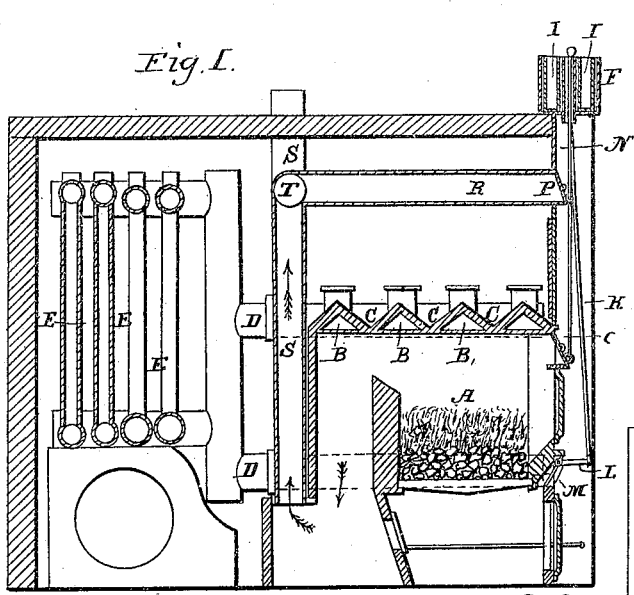
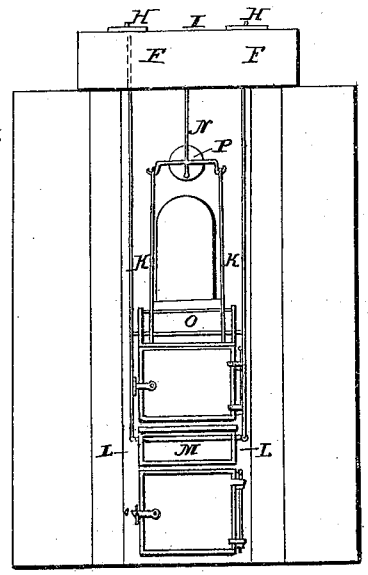
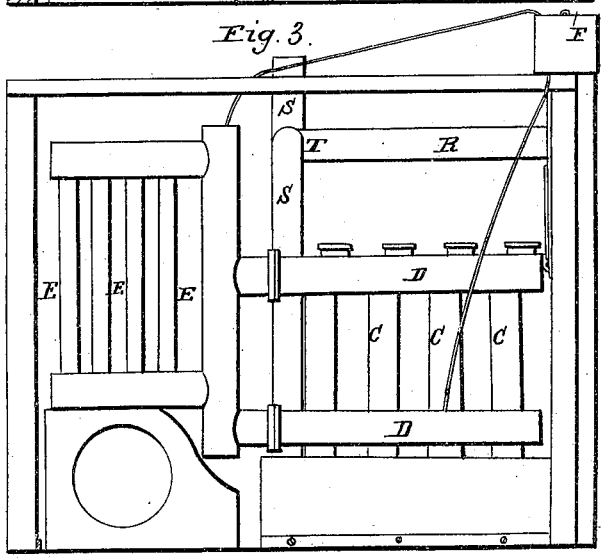

UNITED STATES PATENT OFFICE.

THOMAS T. TASKER, OF PHILADELPHIA, PENNSYLVANIA.

MODE OF REGULATING THE FURNACE OF HOT-WATER APPARATUS.

Specification forming part of Letters Patent No. 12,039, dated December 5, 1854; Reissued May 15, 1866, No. 2,246.

*To all whom it may concern:*

Be it known that I, THOMAS T. TASKER, of Philadelphia, in the county of Philadelphia and State of Pennsylvania, have invented an Improvement in Hot-Water Furnaces, and that the following is a full, clear, and exact description of the principle or character which distinguishes it from all other things before known and of the usual manner of making, modifying, and using the same, reference being had to the annexed drawings, of which—

Figure 1 is a sectional elevation through the furnace from front to rear, Fig. 2 a front view of the furnace showing the regulators Fig. 3 a side view.

My invention consists in a mode of regulating the temperature of furnaces for hot water apparatus by self acting valves and dampers of a peculiar arrangement hereinafter described.

One evil that has been experienced in all hot water arrangements for heating apartments is the unequal heat and circulation from the variations in the fire, from hour to hour and from day to day, and another is the overheating of the water causing it sometimes to boil and generate steam and straining the joints of the tubes by too great expansion. These I have effectually guarded against by my arrangements for controlling the draft through the furnace, the construction and operation of which are as follows. I will premise that the arrangement and construction of the circulating apparatus, I do not intend to claim under this application and therefore will not attempt to describe them only so far as may be necessary for the purposes of this case.

A is the furnace, the walls of which are composed of tubes B of a triangular form in the cross section and so arranged that by meeting of their edges as seen at C the inner surface of the walls are even and the outer surface presents a zig-zag line in the cross section. These tubes are connected by main tubes D, D, which convey the heated water to the circulating system of tubes E, E, whence the water is conveyed to the open vessel F and thence down through tubes G G to the heaters B, B. In the vessel F are three floats H, H, and I. To the floats H, H, all connected metallic rods K, K which take hold of short rods L L attached to the draft valve M and connected with the float I is a rod N which takes hold of a valve O above the fire and also hold of a damper P placed at the end of the flue R which enters the smoke pipe S, at T. As the temperature of the water rises it expands and carries up the floats H, H, which through the rods K, K, operates to close the draft valve M and check the fire, and the float I operates through rod N to open the valve O and also the damper P. When fire is thoroughly ignited it is often difficult to check it as quick as necessary by shutting the draft below, and though the admission of a draft of cold air above the fire has a tendency to check it, yet under some circumstances it may for a while increase it, and I have therefore provided for the admission of cold air directly into the smoke flue through damper P. With these provisions I have obtained complete control over the fire and this automatic regulation, has been found so reliable that where the floats are adjusted for a given temperature, the temperature of the heated air is regulated to a degree, as long as a good fire is kept up, and there is no material change in the weather.

The floats or rods may be set to give any required temperature by the methods usually employed in pyrometric regulators for stoves, etc.

As the expansion and contraction of the water takes place slowly the action upon the fire is in consequence gradual, and not sudden as in pyrometric arrangements when metallic rods connected with the dampers are expanded by the heat of stoves or fires.

The loss of water from the vessel F by evaporation is supplied as often as necessary in order to keep the regulators to a uniform action.

I do not claim operating dampers, valves, or such like things through rods connected with floats, but

I claim—

The arrangement of the two sets of floats operating the valves M, O, and damper P and the open vessel F in combination with a circulating hot water apparatus as set forth.

THOMAS T. TASKER.

Witnesses:
HEZEKIAH GLOVER,
THOMAS T. TASKER, Jr.